United States Patent [19]

Ueno et al.

[11] Patent Number: 5,037,904

[45] Date of Patent: Aug. 6, 1991

[54] METHOD OF PREVENTING POLYMER SCALE DEPOSITION

[75] Inventors: Susumu Ueno; Ichiro Kaneko, both of Hazaki; Mikio Watanabe, Kamisu, all of Japan

[73] Assignee: Shin-Etsu Chemical Co., Ltd., Tokyo, Japan

[21] Appl. No.: 473,412

[22] Filed: Feb. 1, 1990

[30] Foreign Application Priority Data

Feb. 2, 1989 [JP] Japan .................................. 1-24713

[51] Int. Cl.$^5$ .............................................. C08F 2/04
[52] U.S. Cl. ..................................... 526/62; 526/208; 526/210; 422/131
[58] Field of Search ....................... 526/62, 208, 210; 422/131

[56] References Cited

U.S. PATENT DOCUMENTS 4,105,839  8/1978  Koyanagi et al. ..................... 526/62
4,933,399  6/1990  Shimizu et al. ....................... 526/62

Primary Examiner—Joseph L. Schofer
Assistant Examiner—Tom Weber
Attorney, Agent, or Firm—Oblon, Spivak, McClelland, Maier & Neustadt

[57] ABSTRACT

A method of preventing polymer scale deposition in a polymerization vessel during polymerization of a monomer having an ethylenically double bond, wherein said polymerization is carried out in a polymerization vessel of which the inner wall has a coating comprising a reaction product of a tannin and an aldehyde; a scale preventive agent comprising said reaction product; and a polymerization vessel having said coating on the inner wall thereof. Polymer scale deposition on the inner wall, etc. of the polymerization vessel can be effectively prevented.

14 Claims, No Drawings

METHOD OF PREVENTING POLYMER SCALE DEPOSITION

BACKGROUND OF THE INVENTION

1. Field of the Invention

The present invention relates to a method of preventing polymer scale deposition on the inner wall and so forth of a polymerization vessel during polymerization of a monomer having an ethylenically double bond.

2. Description of Prior Art

In processes of preparing polymers by polymerizing a monomer in a polymerization vessel, the problem that polymers deposit on the inner wall and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the workers may be exposed to the unreacted monomer, which may give them some physical disorders.

Heretofore, there are known methods for preventing polymer scale deposition in which the inner wall and so forth are coated with various materials that act as polymer scale preventive agents, for example, particular polar compounds (Japanese Patent Publication (KOKOKU) No. 30343/1970); dyes or pigments (Japanese Patent Publication (KOKOKU) No. 30835/1970); an aromatic amine compound (Japanese Pre-examination Patent Publication (KOKAI) No. 50887/1976); a reaction product of a phenolic compound with an aromatic aldehyde (Japanese Pre-examination Patent Publication (KOKAI) No. 54317/1980)

These methods are effective in preventing polymer scale deposition, in the case where the monomer to be polymerized is vinyl halide such as vinyl chloride or a monomer mixture containing a large amount of vinyl halide and a small amount of other monomers copolymerizable therewith. However, the scale-preventing effect achieved varies depending on polymerization conditions such as the kind of monomers, the ratio of materials charged in a polymerization, the kind of a polymerization catalyst, and the material of the inner wall of a polymerization vessel; it is difficult to prevent the scale deposition effectively and certainly. Specifically, when a polymerization catalyst with a strong oxidative effect such as potassium persulfate, acetylcyclohexylsulfonyl peroxide and di-2-ethoxyethyl peroxydicarbonate is used, the scale preventive agent forming the coating may be oxidized, so that the scale preventing effect is lowered. In the case of polymerization vessels with inner wall made of stainless steel or other steels, polymer scale deposition is liable to occur as compared with vessels lined with glass. Emulsion polymerization is liable to form polymer scale deposition as compared with suspension polymerization.

SUMMARY OF THE INVENTION

Accordingly, it is an object of the present invention to provide a method of preventing polymer scale deposition effectively and certainly under any conditions as to the kind of monomer, etc.

The present inventors have discovered that the above object can be achieved by coating the inner wall of a polymerization vessel with a coating comprising a particular compound.

Thus, the present invention provides, as a means of solving the prior art problems, a method of preventing polymer scale deposition in a polymerization vessel during polymerization of a monomer having an ethylenically double bond, wherein said polymerization is carried out in a polymerization vessel of which the inner wall has a coating comprising a reaction product of a tannin and an aldehyde.

The present invention also provides the polymerization vessel of which the inner wall has a coating comprising said reaction product.

Further, the present invention provides a polymer scale preventive agent comprising said reaction product.

According to the present invention, polymer scale deposition can be effectively and certainly prevented in the polymerization of monomers having an ethylenically double bond. Particularly, even in the case of polymerizing monomers in a stainless steel polymerization vessel, by emulsion polymerization, or by use of a polymerization catalyst having a strong oxidative effect, polymer scale deposition can be effectively and certainly prevented. Therefore, the operation of removing polymer scale is not required to be conducted every polymerization run; hence productivity is markedly improved. And polymers of high quality can be produced stably.

DETAILED DESCRIPTION OF PREFERRED EMBODIMENTS

Reaction product of tannin and aldehyde

The coating formed on the inner wall of a polymerization vessel comprises a reaction product of a tannin and an aldehyde. The reaction product can be produced by known processes, for example, described in Chemical Abstract, 98-35, 649q; Imoto,M, ADHESION, published by Kobunshi Kankokai, Japan, No. 8, 1980, pp383-386; and Japanese Pre-examination Patent Publication (KOKAI) No. 192414/1982. For example, the reaction product can be produced by subjecting the tannin and the aldehyde to co-condensation in a solvent such as an aqueous medium or an organic solvent under an inert atmosphere, e.g., a nitrogen atmosphere at 30° to 80° C. In this reaction, hydrochloric acid, sulfuric acid, phosphoric acid, or the like may be used.

The tannin used in production of the reaction product includes, for example, hydrolyzable tannins such as tannic acid, Chinese gallotannin, nutgalls tannin, sumac tannin, tara tannin, valonia tannin, chestnut tannin, myrobalan tannin, oak tannin, divi-divi tannin, algarobillatannin and the like, and condensed tannins such as gambier tannin, quebracho-tannin, mimosa tannin, mangrove tannin, hemlock tannin, spruce tannin, Burma cutch tannin, oak bark tannin, tannin of persimmon or shibuol and the like. These can be used singly or in combination of two or more. Among the tannins, preferred are tannic acid, Chinese gallotannin, nutgalls tannin, quebracho-tannin, mimosa tannin, oak bark tannin and tannin of persimmon or shibuol.

The aldehyde used in the production of the reaction product includes, for example, aliphatic aldehydes such as formaldehyde, acetaldehyde, propionaldehyde, n- butyraldehyde, isobutyraldehyde, acrolein, crotonaldehyde and chloral, and aromatic aldehydes such as benzaldehyde, 2-methylbenzaldehyde, 3-methylbenzualdehyde, 4-methylbenzaldehyde, 1,2-diformylbenzene, 1,3-diformylbenzene and 1,4-diformylbenzene. These can be used singly or in combination of two or more. Among them, preferred are formaldehyde, acetaldehyde, acrolein, chloral, benzaldehyde, and 1,2-diformylbenzene.

In the reaction for production of said reaction product, the weight ratio of the tannin/the aldehyde is normally 95/5 to 10/90, and preferably from 90/10 to 30/70. The tannin in too small an amount or in too large an amount may result in poor yield of the reaction product.

Formation of the coating

The coating of said reaction product of the tannin and an aldehyde can formed, for example, by applying a coating solution comprising said reaction product on the inner wall of a polymerization, followed by drying.

The coating solution can be prepared by dissolving or dispersing the reaction product in a suitable solvent. The concentration of the reaction product may be normally from about 0.005% by weight to about 5% by weight, preferably from 0.05 to 2% by weight. However, the concentration is not particularly limited, as long as the desired coating weight is obtained.

The solvent used for preparation of the coating solution include, for example, water; alcohols such as methanol, ethanol, propanol, 1-butanol, 2-butanol, 2-methyl-1-propanol, 2-methyl-2-propanol, 3-methyl-1-butanol, 2-methyl-2-butanol, and 2-pentanol; ketones such as acetone, methyl ethyl ketone, and methyl isobutyl ketone; esters such as methyl formate, ethyl formate, methyl acetate, and methyl acetoacetate; ethers such as 4-methyl dioxolan, and ethylene glycol diethyl ether; and aprotic solvents such as dimethylformamide, dimethyl sulfoxide, and acetonitrile. These solvents are appropriately used singly or as a mixed solvent of two or more.

The coating solution is applied to the inner wall surface of the polymerization vessel, thoroughly dried, and optionally washed with water as required, to form the coating having scale preventing effect. The drying of the solution applied on the inner wall may be conducted, for example, at a temperature of from room temperature to 100° C.

Preferably, the coating comprising said reaction product is also previously formed on other parts of the polymerization vessel with which the monomer comes into contact during polymerization, in addition to the inner wall. Such parts include, for example, stirring blades, a stirring shaft, a condenser, a header, baffles, search coils, bolts, nuts, etc. The coating on these parts can be formed in the same manner as described above. Particularly, stirring blades, stirring shaft, and baffles should be coated.

Moreover, preferably, the coating solution is also applied to parts of recovery system for an unreacted monomer with which the unreacted monomer may come into contact, for example, the inner surfaces of monomer distillation columns, condensers, monomer stock tanks and valves. Scale formation can be thereby prevented at these parts due to a coating thus formed.

The method of applying the coating solution is not particularly limited, and includes typically the brush coating, spray coating, the method of filing the polymerization vessel with the coating solution followed by withdrawal thereof, and automatic coating methods as disclosed in Japanese Pre-examination Patent Publication (KOKAI) Nos. 61001/1982, 36288/1980 and 11303/1984, Japanese Pre-examination Publication (KOHYO) Nos. 501116/1981 and 501117/1981. The method of drying wet coated surfaces is not limited, either. Following methods can be used. For example, a method in which, after the solution is applied, hot air with an suitable elevated temperature is blown to the coated surface, and a method in which the inner wall surface of a polymerization vessel and other parts to be coated are previously heated, and the coating solution is directly applied on the heated inner wall surface, etc. After dried, the coated surfaces are washed with water if necessary.

The coating thus formed has normally a coating weight of from 0.005 to 5 $g/m^2$, preferably from 0.05 to 2 $g/m^2$ in the dried state.

The coating operation may be conducted every 1 to ten-odd polymerization runs. The formed coating has considerably good durability and retains the scale-preventing effect; therefore the coating operation is not necessarily performed every polymerization run.

Polymerization

After the formation of the coating on the inner wall surface of a polymerization vessel, etc., polymerization is carried out in accordance with conventional procedures. That is, a monomer having an ethylenically double bond, a polymerization initiator, and other necessary additives such as a dispersing agent for the monomer, and optionally a polymerization medium are charged into the polymerization vessel, followed by carrying out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters or salts of these; maleic acid or fumaric acid, and esters or anhydrides thereof; and diene monomers such as butadiene, chloroprene and isoprene; as well as styrene, α,-methylstyrene, acrylates, acrylonitrile, halogenated vinylidenes, and vinyl ethers.

There are no particular limitations on the form of polymerization to which the method of this invention can be applied. The present invention is effective in any forms of polymerization such as suspension polymerization, emulsion polymerization, solution polymerization and bulk polymerization.

More specifically, in the case of suspension or emulsion polymerization, polymerization is generally carried out by a process comprising the steps of charging water and a dispersing agent into a polymerization vessel, charging a polymerization initiator, evacuating the inside of the polymerization vessel to a pressure of from about 0.1 mmHg to about 760 mmHg, charging a monomer (whereupon the pressure inside the polymerization vessel usually becomes from 0.5 to 30 kg.cm$^{-2}$), polymerizing the monomer at a temperature of from about −10° C. to 150° C., and optionally adding at least one of water, a dispersing agent and polymerization initiator during polymerization. The polymerization may be judged to be completed when the pressure inside the vessel falls to from about 0 to about 7 kg.cm$^{-2}$G. The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel to a pressure of from about 0.01 mmHg to about 760 mmHg, charging a monomer, and then charging a polymerization initiator, and then carrying out polymerization at $-10°$ C. to 250° C.

The method of this invention is effective regardless of the materials constituting the inner wall, etc. of a polymerization vessel. That is, this method is effective for any type of polymerization vessels having inner wall made of stainless steel or lined with glass.

Accordingly, any additive materials that are conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, di-2-ethylhexyl peroxydicarbonate, 3,5,5-trimethylhexanoyl peroxide, α-cumyl peroxyneodecanoate, cumene hydroperoxide, cyclohexanone peroxide, t-butyl peroxypivalate, di-2-ethoxyethyl peroxydicarbonate, benzoyl peroxide, lauroyl peroxide, 2,4-dichlorobenzoyl peroxide, diisopropyl peroxydicarbonate, acetylcyclohexylsulfonyl peroxide, α,α'-azobisisobutyronitrile, α,α'-azobis-2,4-dimethylvaleronitrile, potassium persulfate, ammonium persulfate, p-menthane hydroperoxide; suspension agents comprised of natural or synthetic polymers such as partially oxidized polyvinyl acetates, polyacrylic acids, vinyl acetate/maleic anhydride copolymer, cellulose derivatives such as hydroxypropyl cellulose, and gelatin; solid dispersants such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters.

EXAMPLES

The method of the present invention is now described by way of working examples and comparative examples. In each of the tables below, Experiment Nos. marked with * indicate comparative examples, and the other Experiment Nos. are working examples of the present invention.

Production of the reaction product (1) Production of Reaction Product No. 1

In a reaction vessel, 70 g of tannic acid, 25 g of 37% formalin, and 80 g of methanol were mixed, and reacted at 75° C. under a nitrogen atmosphere with stirring for 2 hours. The resulting reaction mixture was dried under reduced pressure to give 90 g of a reaction product (Reaction Product No. 1).

(2) Production of Reaction Product No. 2

In a reaction vessel, 50 g of quebracho-tannin, 3 g of 35% hydrochloric acid, 10 g of chloral and 100 g of water were mixed, and reacted at 100° C. under a nitrogen atmosphere with stirring for 3 hours. The resulting reaction mixture was dried under reduced pressure to give 60 g of a reaction product (Reaction Product No. 2).

(3) Production of Reaction Product No. 3

In a reaction vessel, 100 g of tannic acid, 20 g of benzaldehyde, 50 g of phosphoric acid and 400 g of water were mixed, and reacted at 120° C. under a nitrogen atmosphere with stirring for 6 hours. The resulting reaction mixture was filtered off, and then washed with hot water 5 to 6 times in order to remove excess phosphoric acid, followed by drying, to give 70 g of a reaction product (Reaction Product No. 3).

EXAMPLE 1

Polymerization was carried out in the following manner using a polymerization vessel with a inner capacity of 1,000 liters and having a stirrer.

In each experiment, first, a reaction product was dissolved in a solvent as given in Table 1 to prepare a coating solution. The coating solution was applied to the inner wall and other parts with which monomers come into contact during polymerization, such as the stirring shaft, stirring blades and baffles. Then, the wet coated surfaces were dried by heating at 50° C for 15 min., followed by washing with water. However, Experiment Nos. 101 to 103 are comparative examples in which no coating solution was applied, or a coating solution containing a tannin only was applied. The reaction product and solvent used, and the concentration of the reaction product in the coating solution in each experiment are given in Table 1.

Subsequently, in the polymerization vessel thus coated, were charged 400 kg of water, 200 kg of vinyl chloride, 250 g of partially saponified polyvinyl alcohol, 25 g of hydroxypropylmethyl cellulose and 75 g of diisopropyl peroxydicarbonate. Then, polymerization was carried out at 75° C. with stirring for 6 hours. After the completion of the polymerization, the amount of polymer scale depositing on the inner wall of the polymerization vessel was measured. The results are given in Table 1.

TABLE 1

| | Coating solution | | | |
|---|---|---|---|---|
| Exp. No. | Solute | Solvent (ratio) | Concentration % by weight | Scale amount g/m² |
| *101 | — | — | — | 1,300 |
| *102 | tannic acid | Water/methanol (90/10) | 0.5 | 1,200 |
| *103 | Quebracho-tannin | Water/methanol (90/10) | 0.5 | 1,200 |
| 104 | Reaction Product No.1 | Water/methanol (90/10) | 0.5 | 5 |
| 105 | Reaction Product No.3 | Water | 0.2 | 7 |
| 106 | Reaction Product No.3 | Water/methanol (50/50) | 0.2 | 10 |
| 107 | Reaction Product No.1 | Water/methanol (90/10) | 0.2 | 8 |
| 108 | Reaction Product No.2 | Water/methanol (50/50) | 0.2 | 10 |
| 109 | Reaction Product No.2 | Water/methanol (50/50) | 0.2 | 15 |
| 110 | Reaction Product No.1 | Water | 0.4 | 20 |

EXAMPLE 2

In each experiment, a polymerization vessel with an inner capacity of 20 liters and having a stirrer was coated with a coating solution used in the Experiment shown in Table 2 in the same manner as in Example 1, thereby a coating was formed. However, Experiment No. 201 is a comparative example in which no coating solution was coated.

Subsequently, in the polymerization vessel thus coated, were charged 9 kg of water, 22 g of sodium dodecylbenzenesulfonate, 12 g of t-dodecyl mercaptan, and 13 g of potassium persulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall of the polymerization vessel was measured. The results are given in Table 2.

TABLE 2

| Exp. No. | Coating solution | Scale amount ($g/m^2$) |
| --- | --- | --- |
| *201 | — | 400 |
| *202 | Exp. No. 102 | 390 |
| *203 | Exp. No. 103 | 390 |
| 204 | Exp. No. 104 | 2 |
| 205 | Exp. No. 105 | 5 |
| 206 | Exp. No. 106 | 9 |
| 207 | Exp. No. 107 | 7 |
| 208 | Exp. No. 108 | 10 |
| 209 | Exp. No. 109 | 12 |
| 210 | Exp. No. 110 | 14 |

We claim:

1. A method of preventing polymer scale deposition in a polymerization vessel during polymerization of a monomer having an ethylenic double bond, wherein said polymerization is carried out in a polymerization vessel of which the inner wall has a coating comprising a reaction product of a tannin selected from the group consisting of tannic acid. Chinese gallotannin, nutgalls tannin, quebracho-tannin, mimosa tannin, oak bark tannin and tannin of persimmon and an aldehyde.

2. The method according to claim 1, wherein said aldehyde is selected from the group consisting of formaldehyde, acetaldehyde, acrolein, chloral, benzaldehyde, and 1,2-diformylbenzene.

3. The method according to claim 1, wherein said reaction product is produced by co-condensation of the tannin with the aldehyde in a solvent under an inert atmosphere at a temperature of from 30° to 180° C.

4. The method according to claim 1, wherein the weight ratio of said tannin to said aldehyde is in a range of from 95/5 to 10/90.

5. The method according to claim 1, wherein said coating has been formed by applying a coating solution comprising said reaction product on the inner wall of a polymerization, followed by drying.

6. The method according to claim 5, said coating solution contains said reaction product at a concentration of from 0.005 to 5 $g/m^2$.

7. The method according to claim 1, wherein said coating has a coating weight of from 0.005 to 5 $g/m^2$.

8. The method according to claim 1, wherein said coating has been previously formed on parts of the polymerization vessel with which the monomer comes into contact during polymerization other than its inner wall surface.

9. The method according to claim 8, wherein said parts with which the monomer comes into contact are selected from the group consisting of a stirring shaft, stirring blades, baffles, headers, search coils and condensers.

10. The method according to claim 1, wherein said coating has been further previously formed at parts of the recovery system of an unreacted monomer with which the monomer comes into contact during polymerization.

11. The method according to claim 1, wherein the monomer is at least one member selected from the group consisting of vinyl halides; vinyl esters; acrylic acid and methacrylic acid, or esters or salts of these; maleic acid or fumaric acid, and esters or anhydrides thereof; diene monomers; aromatic vinyl compounds; acrylates; acrylonitrile; halogenated vinylidenes; and vinyl ethers.

12. The method according to claim 1, wherein said polymerization is carried out as suspension polymerization, emulsion polymerization, solution polymerization or bulk polymerization.

13. A polymer scale preventive agent comprising a reaction product of a tannin and an aldehyde.

14. A polymerization vessel of which the inner wall has a coating comprising a reaction product of a tannin and an aldehyde.

* * * * *